United States Patent [19]

Perotti et al.

[11] 4,062,255
[45] Dec. 13, 1977

[54] CENTER TURNING TOOL

[76] Inventors: John J. Perotti, R.D. No. 1, Bluebell Road, Vineland, N.J. 08360; George O. Pangburn, R.D. No. 2, Box 153A, Millville, N.J. 08332

[21] Appl. No.: 689,865

[22] Filed: May 25, 1976

[51] Int. Cl.$^2$ .................. B23B 49/04; B23B 21/00
[52] U.S. Cl. .................................... 82/45; 82/24 R
[58] Field of Search ............. 82/24 R, 36 R, 15, 16, 82/17, 6 A, 45, 31

[56] References Cited

U.S. PATENT DOCUMENTS

| 331,046 | 11/1885 | Fitzgerald | 82/24 R |
| 1,029,014 | 6/1912 | Ivarson | 82/24 R |
| 1,067,104 | 7/1913 | Fitzpatrick | 82/36 R |

FOREIGN PATENT DOCUMENTS

| 89,845 | 7/1921 | Switzerland | 82/24 R |

OTHER PUBLICATIONS

"How to Run a Lathe", J. J. O'Brien et al, p. 92, South Bend Lathe Works, 1942.

Primary Examiner—Leonidas Vlachos
Attorney, Agent, or Firm—Clarence A. O'Brien; Harvey B. Jacobson

[57] ABSTRACT

A center turning tool usable with a machinist lathe and insertable in the tailstock thereof. This tool may be used by the improved method of leaving the workpiece set up of the lathe as is and with the addition of this tool perform the cutting or reforming of a proper center in the workpiece. This center reforming tool includes a main support structure having a movable and accurately adjustable keyed toolfinger therein for supporting a toolbit removably held in place thereon. Accurately threaded adjustment structure is provided for the movable toolfinger together with appropriate handle mechanism for making fine accurate movements of the toolfinger structure and toolbit held thereby. A keyway and associated guide pin prevent the toolfinger from revolving within the main support as the toolfinger is moved in and out thereof. The pin is also adjustable to eliminate any sloppiness or movement of the toolfinger and to apply proper tension thereto. The main body is also provided with a tapered or straight arm for supporting same in the tailstock and/or chuck of a lathe.

4 Claims, 5 Drawing Figures

CENTER TURNING TOOL

BACKGROUND OF THE INVENTION

1. Field of the Invention

This invention relates generally to devices for machining metal workpieces and especially to a center turning tool for use with such devices.

2. Description of the Prior Art

A common problem with known machinists' lathe and tools associated therewith is that once a workpiece is set up in the lathe together with a compound rest and carriage, if the center hole of the workpiece becomes damaged or burred, or the center appears to be running out, it has been necessary to tear down the complete setup of the compound tool rest, set up a steady rest, set up the compound rest at the proper angle, set up a proper toolbit, and then recut the center. This is unduly complicated as well as expensive and time consuming.

Another problem with known type devices and the method just described above is that the angle of the center which is cut thereby often varies by several degrees from the desired one. In other words, the above method permits a degree of error in the cutting angle to occur which is objectionable.

Known prior art patents which may be pertinent to this invention are as follows, U.S. Pat. Nos.: 728,013, May 12, 1903; 906,180, Dec. 8, 1908; 2,390,627, Dec. 11, 1945; 2,944,454, July 12, 1960; 53,374, Mar. 20, 1966.

None of these known prior art devices offers the new and unique features of the invention disclosed herein.

SUMMARY OF THE INVENTION

An object of the present invention is to provide a center turning tool for use with a lathe which will permit a center hole to be cut in a workpiece without disturbing the setup of said workpiece in the lathe.

Another object of the present invention is to provide a center turning tool which will cut and reform a center hole in a workpiece with a desired predetermined angle with great accuracy.

A further object of this invention is to provide a lathe and work tool combination which will permit accurate and perfect center holes in a workpiece with less time and expense being involved than is now conventional.

A still further object of this invention is to provide a center turning tool having an accurately adjustable cutting bit holder mounted in a main body support at a predetermined angle to the centerline of a lathe tailstock with appropriate arm structure for mounting the tool in said tailstock. Convenient handle and knob structure also is provided for accurate adjustment of the cutting bit of said tool.

The center turning tool disclosed herein has many advantages over conventional cutting tool structure. It may be quickly inserted into a conventional tailstock of a metal lathe without disturbing or upsetting the compound tool rest, etc. of the lathe and workpiece, and then the tool may be used to accurately reform a center hole in the workpiece.

Another important feature of this invention is in the fact that it will very accurately cut and reform the desired center hole in a workpiece at a fixed predetermined angle. A 60° center hole is very commonly desired and with this tool the same angle may be repeatedly cut and reformed in a workpiece without variation.

Another very important feature of this invention is that the cost of producing this tool in any quantity is very reasonable, as most of all production setups can be made with simple jig and fixture techniques well known in the art.

Another important feature of this center turning tool is that one or two of these structures may be provided for a large machine shop and will be sufficient to handle the needs of a number of machinists and their lathes. This again can substantially save expense and time.

The center turning tool of this invention is a lathe tool which is inserted into the tailstock of a lathe by a main support arm preferably having a Morse taper, which enables the machinist to turn or cut a center hole in a shaft or workpiece being held by the lathe. When an adjustable knob on the tool is turned, preferably clockwise, a movable toolbit holder supported on the tool body moves toward the workpiece, and when the knob is turned in the opposite direction, preferably counterclockwise, then the toolholder moves in the reverse direction away from the workpiece. The cutting bit mounted on the movable structure aforesaid is removable and interchangeable. It may also be resharpened. The angle of the adjustable toolholder structure is preset to an exact predetermined angle, normally 30° off center, which insures a perfect 60° center hole being cut or reformed in the workpiece. An adjusting knob is normally provided together with screw thread means for permitting a fine movement of the toolholder and cutting bit thereon. An optional handle may also be used instead of the knob if preferred by the lathe operator.

A number of advantages are provided by this arrangement. Previously, when a machinist was machining a shaft or workpiece, and found the center thereof to be running out, burred, or otherwise damage, he had to tear down his complete setup in the compound tool rest, set up a steady rest, again set up the compound rest at the proper angle, then set up a proper toolbit, and then recut the center.

With the center turning tool of this invention, the machinist need only set up the steady rest, and recut the center of the workpiece by using only the tailstock of the lathe. Any setup he has in the tool post on the compound rest need not be disturbed.

Another problem with the conventional method aforesaid described is that the angle of the compound rest could be off a fraction of a degree to several degrees. But, by using our tool and simplified method, this angle is fixed and unchangeable, thereby always forming a perfect 60° center hole. Obviously, if desired, the predetermined angle may be other angles than this and this invention envisions any desired angle.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
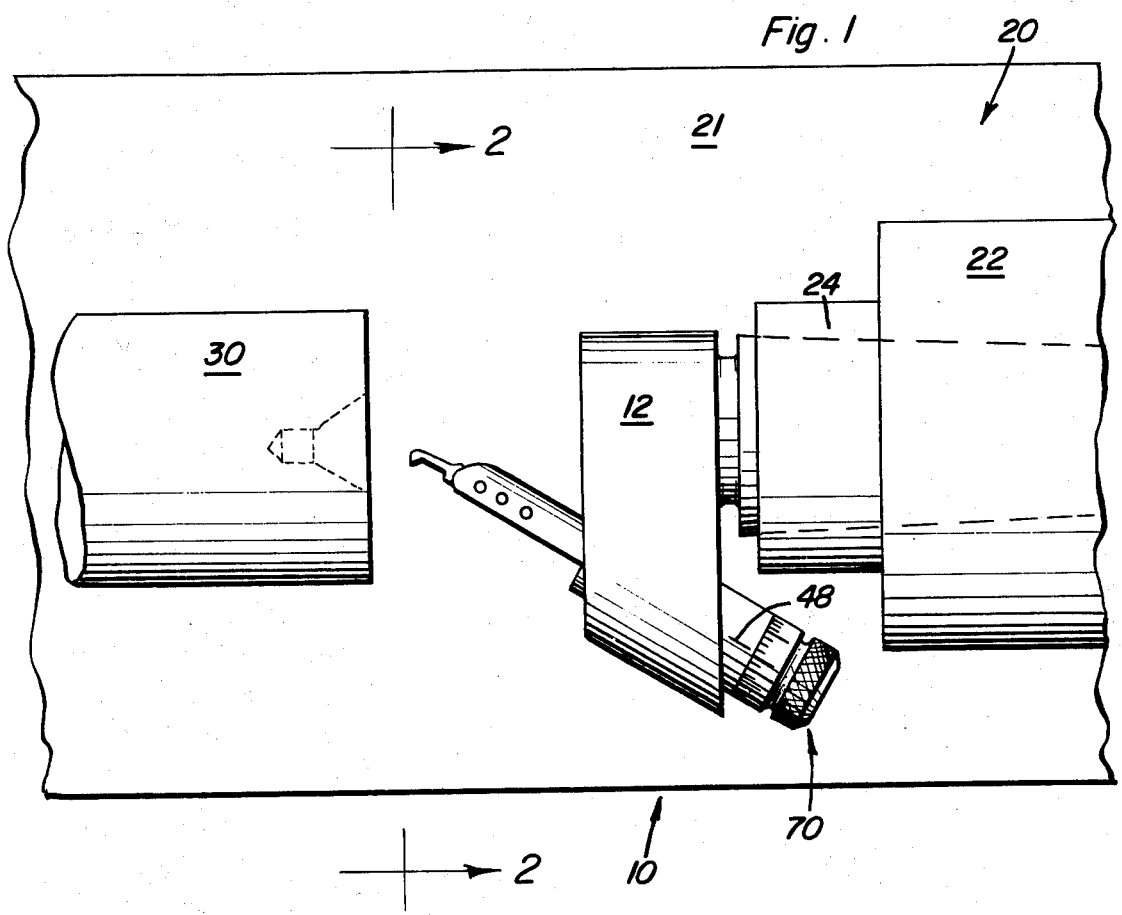
FIG. 1 is a top plan view of the center turning tool of this invention as mounted in a tailstock of a metal lathe.
Figure 2:
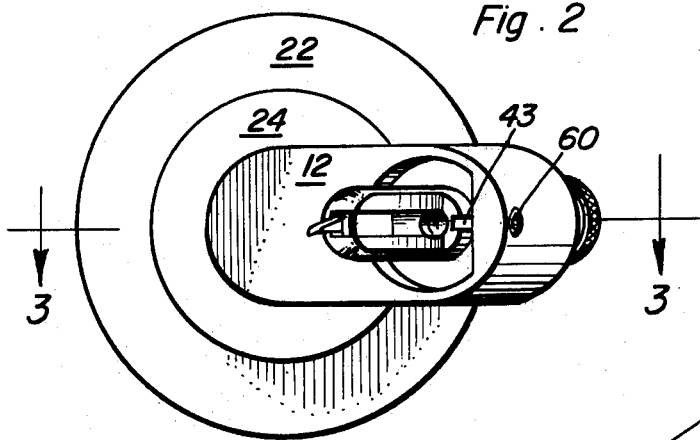
FIG. 2 is an end view taken generally along line 2—2 of FIG. 1.

Preferring to FIG. 1 of the drawings, reference numeral 10 indicates in general; the center turning tool of this invention as installed in the tailstock of a metal working lathe. The tailstock of the lathe is referred to in general by reference numeral 20. The lathe body 21 supports at one end a conventional type head stock structure not shown, at the other end the tailstock structure 20, and intermediate thereof a conventional type steady rest, not shown. The tailstock structure includes the longitudinally adjustable portion 22 with the tailstock quill 24 as shown in FIGS. 1 and 2.

The center turning tool structure of this invention has a main body member 12 with a tailstock quill receiving extension arm 14 provided thereon. Said extension arm may be tapered with a Morse taper, or if desired may be of straight shank for reception in a chuck. A recess 13 is normally provided between the body 12 and the extension arm 14. The body 12 has an aperture 16 drilled at an appropriate accurate angle to the centerline of said body. A workpiece being held by the head stock and compound rest structure of the lathe is indicated at 30. A center hole 32 is shown in this workpiece with the desired center hole 34. A desired predetermined angle or taper 35 is indicated.

Mountable within the drilled hole 16 of the support body 12 is a secondary body member 40. One end of this secondary body member 40 is open while the other end is closed with a central aperture 41 provided therein. This is for containing a threaded stud 80 therewithin. The collar 82 of this threaded stud engages the inside of the closed end of body member 40 while the extension end 84 of the stud has a knurled knob 72 for turning by the operator's fingers together with indicia 74 provided around the outside circumference thereof. A set screw 73 is also provided for retention of said knob on the stud extension 84.

A movable toolfinger 42 for holding the cutting tool fits slidably inside the cylindrical secondary member 40 with a relatively close fit therewith. The movable toolfinger part 42 is provided with a central aperture which is appropriately threaded 47 to complement the threads on the stud 80. Normally, these threads will be of left-hand taper, but obviously right-hand may be used if desired. However, with a left-hand taper, when the knob structure 70 is rotated in the clockwise direction the effect will be to move the toolfinger part 42 upwardly toward the workpiece 30. This is the most conventional direction in the field today. In addition to the relatively close fit between the slidable toolfinger part 42 within the cylindrical secondary member 40 is a keyway 43 provided thereon. This keyway 43 aligns with an adjustable screw 60 having a projecting end 62 for engagement within the keyway. The keyway 43 runs the entire length of the full body portion of the toolfinger 42 and as the set screw or pin 60 engages therewith a twofold purpose is accomplished. One being that the pin being in the keyway keeps the toolfinger from revolving when the toolfinger is moved in and out by means of the threaded portions 47, 80 already described. The second purpose being that the adjustment of the pin 60 against the toolfinger eliminates any slop of the toolfinger. By properly adjusting the tension of the pin 60 against the recess 43, the toolfinger can be made to move smoothly.

The end of the toolfinger 44 is partially recessed and cutaway from that of the main body portion. This cutaway portion is also provided with a recess 45 for reception of the cutting tool 50. This cutting tool 50 has an appropriate pointed cutting end 52 provided thereon of conventional type shape. Obviously, the cutting tool 50, 52 will be of proper cutting type material for maximum cutting life. Set screws 46 appropriately fitted into complementary apertures along one portion of the toolfinger opposite recess 45 will retain the cutting bit mounted within the movable toolfinger. An alignment mark 48 on the outer body 40 may be used together with the knob indicia 74 by the operator for judging the proper adjustment of the toolbit in relation to the workpiece.

Figure 5:
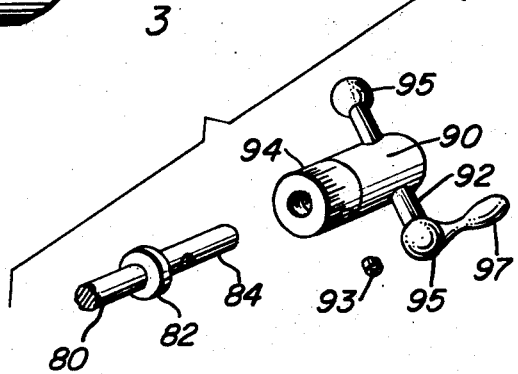
FIG. 5 is an exploded perspective view of a modified embodiment of the adusting mechanism for this tool.
Figure 3:
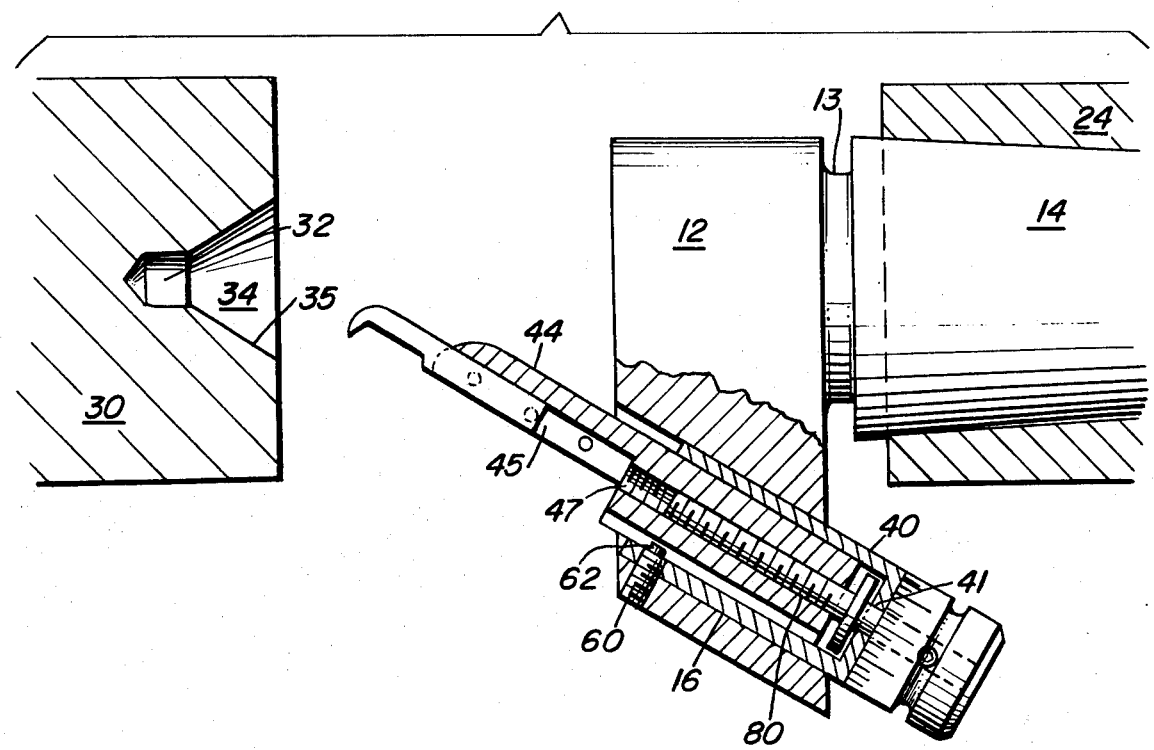
FIG. 3 is a plan view, partly in cross-section, similar to that of FIG. 1.
Figure 4:
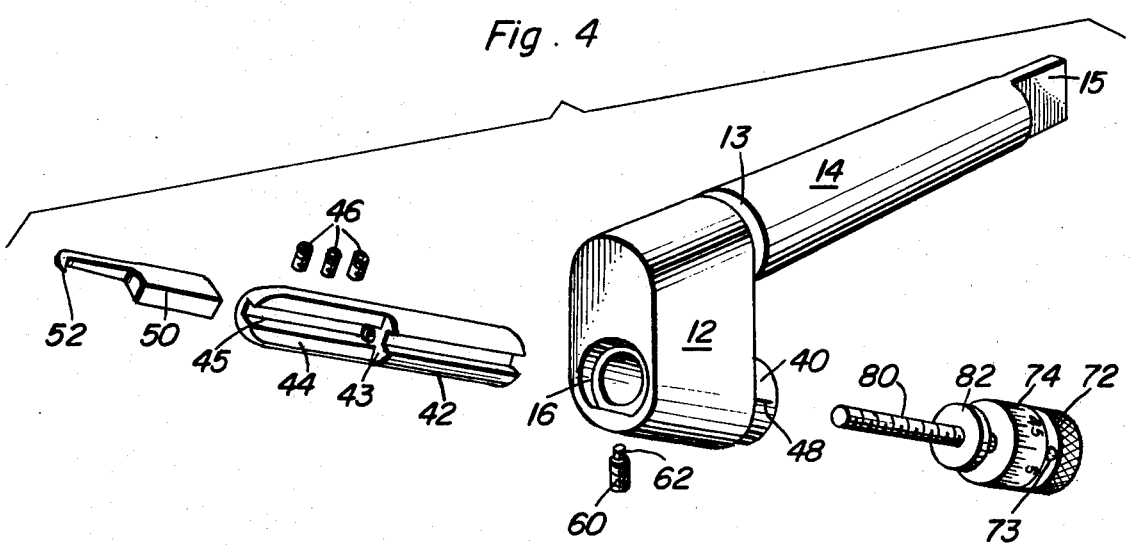
FIG. 4 is an exploded perspective view showing the component parts of the center turning tool of this invention.

FIG. 5 shows a modified adjusting knob handle structure for attachment to the stud extension 84. This adjustable knob structure comprises the main body portion 90 having a handle 92 extending therethrough with end knobs 95 on both ends of said handle member and an extension handle 97 appropriately provided from one of said knobs. A set screw 93 is provided to fasten said knob handle to portion 84 of the stud 80, 82. Appropriate indicia 94 are also provided on the knob handle for adjustment and alignment with the indicating mark 48 on body member 40.

From the above description of the structure of this invention one can easily visualize how a center hole in a workpiece may be properly cut or reformed. The knob adjusting structure together with the fine threads of the stud 80 and central aperture 47 of the movable toolfinger holder will permit fine accurate adjustment of the cutting tool 50, 52. Since the angle of the toolfinger in relation to the centerline of the tool can be very accurately made to any predetermined desired angle, the angle of the finished center hole will be very, very accurate. The most commonly desired center holes today are either 60° or 90°. Therefore, the angle of the toolfinger in relation to the centerline of the tool would be correspondingly set at 30° or 45°. This is afixed, unmovable angle, and must be predetermined before the construction of the center turning tool. By the angle being fixed and unchangeable, it insures that the angle cut by the center turning tool is always exactly as desired.

The center turning tool of this invention enables the user to machine a predrilled center hole in a bar, shaft or roll type workpiece when held in a lathe or related machine. The center hole enables a machinist to support the bar, shaft, or roll in the lathe between the centers, or by use of a chuck, and center. The center is inserted into the tailstock of the lathe.

One of the most common ways to put a center hole into a workpiece is by the use of a combination center drill and counter sink. But, in most cases, the hole must still be machined while the piece is turning in the lathe and while being supported therein by the use of a lathe steady rest. The tapered portion of the center hole must be recut to insure concentricity between the hole and the outside of the workpiece. This is usually done by setting the angle of the compound tool rest of the lathe. A toolbit is held in a toolholder, and by the use thereof the hole is recut. When remachining a piece it is sometimes necessary to remachine this tapered portion of the center hole to insure that the center hole is concentric with the outside of the piece, and to insure that the hole has not been deformed or damaged.

With the center turning tool of this invention, the method of holding the piece to be worked upon would be the same, but the use of the compound rest and carriage of the lathe is not necessary. Our tool is inserted into the quill of the tailstock of the lathe. With the tool in position, the tailstock is locked to the bedways of the lathe. The center turning tool can now be moved closer or further from the piece by moving the quill of the tailstock of the lathe. When the tool has been placed into position, the quill of the tailstock of the lathe is locked. The tapered portion of the center hole can then be cut by the toolbit of our center turning tool. To take a deeper cut, the quill lock is released and the tool is moved closer to the piece. The quill is then relocked, and another cut taken.

As described above, the angle cut by this tool is predetermined and therefore there is no chance of making a cut at an improper angle.

The toolfinger mounted on the body portion with the arm extension may be used with conventional tailstocks and/or with chuck-type lathes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A center turning tool for use with a machinist lathe and the like comprising: means provided so that the tool can be used to recut and reform a damaged center of a workpiece held in the lathe without disturbing the compound tool rest of the lathe and the workpiece including; a main support structure fittable removably into the adjustable tailstock of the lathe, an adjustable tool holder mounted at a predetermined angle on the main support structure by means of an accurately drilled aperture in the main support structure, the adjustable tool holder being a close fit within said aperture, an elongated longitudinal keyway provided in the outer circumference of said tool holder, an adjusting screw mounted in the tool holder perpendicular to the aperture and the keyway of the tool holder and extending into said keyway to prevent rotation of the tool holder relative to said aperture in the main support structure, a workpiece center cutting tool held in said adjustable tool holder, and means for accurately adjusting the toolholder, the adjusting means including a stud having fine accurate threads provided thereon for engagement with complementary threads within an aperture provided in the adjustable tool holder.

2. The structure as set forth in claim 1, wherein a knurled knob structure is provided on the threaded stud for accurate adjustment of same.

3. The structure as set forth in claim 2, wherein the predetermined angle of the adjustable cutting structure is an arcuate 30° to the centerline of the workpiece.

4. The structure as set forth in claim 2, wherein the predetermined angle of the adjustable cutting structure is an arcuate 45° to the centerline of the workpiece.

* * * * *